(12) United States Patent
Dahl

(10) Patent No.: US 8,627,224 B2
(45) Date of Patent: Jan. 7, 2014

(54) TOUCH SCREEN KEYPAD LAYOUT

(75) Inventor: Sten Jorgen Ludvig Dahl, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 631 days.

(21) Appl. No.: 12/606,368

(22) Filed: Oct. 27, 2009

(65) Prior Publication Data

US 2011/0099505 A1   Apr. 28, 2011

(51) Int. Cl.
*G06F 3/048* (2013.01)

(52) U.S. Cl.
USPC ............... 715/773; 715/772; 345/173

(58) Field of Classification Search
USPC .................. 715/773, 772; 345/173
See application file for complete search history.

(56) References Cited

U.S. PATENT DOCUMENTS

| | | | |
|---|---|---|---|
| 2005/0253816 A1 | 11/2005 | Himberg et al. | |
| 2007/0016862 A1* | 1/2007 | Kuzmin | 715/700 |
| 2007/0100635 A1* | 5/2007 | Mahajan et al. | 704/276 |
| 2007/0152980 A1* | 7/2007 | Kocienda et al. | 345/173 |
| 2008/0205960 A1* | 8/2008 | Siddeeq | 400/489 |
| 2008/0284744 A1* | 11/2008 | Park et al. | 345/173 |
| 2008/0297377 A1* | 12/2008 | Wang et al. | 341/22 |
| 2008/0304890 A1* | 12/2008 | Shin et al. | 400/61 |
| 2008/0316179 A1* | 12/2008 | Griffin et al. | 345/169 |
| 2009/0113299 A1* | 4/2009 | Chung | 715/702 |
| 2009/0146848 A1* | 6/2009 | Ghassabian | 341/22 |
| 2009/0146957 A1* | 6/2009 | Lee et al. | 345/168 |
| 2010/0017872 A1* | 1/2010 | Goertz et al. | 726/16 |
| 2010/0245276 A1* | 9/2010 | Sim | 345/173 |
| 2010/0259561 A1* | 10/2010 | Forutanpour et al. | 345/660 |
| 2010/0333011 A1* | 12/2010 | Kornev et al. | 715/773 |

FOREIGN PATENT DOCUMENTS

| | | |
|---|---|---|
| DE | 10012671 A1 | 9/2001 |
| FR | 2806491 A1 | 9/2001 |
| JP | 2008084144 A | 4/2008 |
| TW | 200846980 A | 12/2008 |
| WO | WO2008057785 A2 | 5/2008 |

OTHER PUBLICATIONS

Hirche et al.; Adaptive Interface for Text input on large-Scale Interactive Surfaces; © 2008; IEEE; 4 pages.*
McDermott-Wells; Evaluation of Three Stylus-Based Text Entry Methods On a Pocket PC™ Mobile Device; © 2006; IEEE; seven pages.*
International Search Report—PCT/US2010/054214—ISA/EPO—Mar. 2, 2011.
Written Opinion—PCT/US2010/054214—ISA/EPO—Mar. 2, 2011.
Taiwan Search Report—TW099136558—TIPO—Aug. 29, 2013.

* cited by examiner

*Primary Examiner* — Linh K Pham
(74) *Attorney, Agent, or Firm* — Jeffrey D. Jacobs

(57) ABSTRACT

A apparatus includes a touch-screen display. A virtual keypad is displayed wherein the keys are sized in accordance with their location. Keys located in a corner of the display are smallest, keys located on an edge but not in a corner are larger, and keys not having any contact with an edge are largest. A user can easily select keys for entering a text message using multi-tap or predictive text algorithms.

16 Claims, 6 Drawing Sheets

TOUCH SCREEN KEYPAD LAYOUT

BACKGROUND

1. Field

This application relates generally to wireless communication devices, and more particularly to wireless communications devices having a custom, touch-screen keypad layout.

2. Background

Sending text messages or "texting" from one mobile device to another is becoming increasingly popular. A variety of techniques are known for sending text messages which do not require a full QWERTY keyboard. Rather, techniques such as T9 or multi-tap enable users to send text messages using a standard numeric phone keypad wherein letters are associated with the numbers on the keypad.

In these typical mobile devices having a standard numeric keypad, the user can feel the buttons while moving across the keys. As such, navigation among the keys is easy, and users can compose messages quickly. Many users are able to easily compose text messages without even looking at the keys.

Touch screen devices are a popular design feature of newer mobile devices. A virtual keypad is rendered on the device's display, and the user enters the desired text by touching the rendered keypad. There are several drawbacks associated with touch screen devices. A user cannot easily navigate across keys by touch, as is done in a typical keyboard, as there is no tactile feedback to indicate movement from one key to another. Because the keys are close together and a user cannot detect key separation by touch, it is easy for a user to mistakenly touch the wrong key. Moreover, it would be difficult to create text messages or perform other keyboard entry steps without looking at the keys because the user cannot feel as the user moves across the keys.

Some touch screen devices include a pullout keyboard having traditional buttons. However, many users find it undesirable to switch between multiple input modes. It would be desirable to have a text entry method for touch screen devices wherein a user can easily and quickly enter text messages or perform other keyboard operations, possibly without looking at the keys.

SUMMARY

In one aspect of the disclosure, method for entering data, comprises generating a virtual keypad, the virtual keypad comprising a plurality of keys including numeric keys, one or more of the numeric keys having alphabetic characters associated therewith, wherein the size of each of the plurality of keys is dependent at least in part on the location of the key in reference to a corner or edge of a touch-screen display; and displaying the virtual keypad on the touch-screen display.

In another aspect of the disclosure, a computer program product, comprises computer-readable medium comprising code for causing a computer to generate a virtual keypad, the virtual keypad comprising a plurality of keys including numeric keys, one or more of the numeric keys having alphabetic characters associated therewith, wherein the size of each key is dependent at least in part on the location of the key in reference to a corner or edge of a touch-screen display, the virtual keypad to be displayed on the touch-screen display.

In yet another aspect of the disclosure, an apparatus, comprises means for generating a virtual keypad, the virtual keypad comprising a plurality of keys including numeric keys, one or more of the numeric keys having alphabetic characters associated therewith, wherein the size of each key is dependent at least in part on the location of the key in reference to a corner or edge of a touch-screen display; and means for displaying the virtual keypad on the touch-screen display.

In a further aspect of the disclosure, an apparatus for wireless communications, comprises a touch-screen display; and a user interface module for generating a virtual keypad, the virtual keypad comprising a plurality of keys including numeric keys, one or more of the numeric keys having alphabetic characters associated therewith, wherein the size of each of the plurality of keys is dependent at least in part on the location of the key in reference to a corner or edge of the touch-screen display.

BRIEF DESCRIPTION OF THE DRAWINGS

Various aspects of apparatuses and methods, and the environments in which they operate, in will now be presented in the detailed description that follows, and in the accompanying drawings, wherein.

DETAILED DESCRIPTION

Various aspects of apparatuses and methods, and the environments in which they operate, will be described below. The apparatuses and methods, however, may be embodied in many different forms and should not be construed as limited to the various configurations presented throughout this disclosure. Rather, the various aspects of these apparatuses and methods are provided so that this disclosure will be thorough and complete, and will fully convey the scope of the present invention to those skilled in the art. As those skilled in the art will readily appreciate, various details may be presented for the purpose of providing a thorough understanding of the apparatuses and methods, however, various configurations of these apparatuses and steps of the methods may be implemented without these specific details. In some instances, well-known structures and components are shown in block diagram form in order to avoid obscuring the various concepts presented throughout this disclosure.

Figure 1:
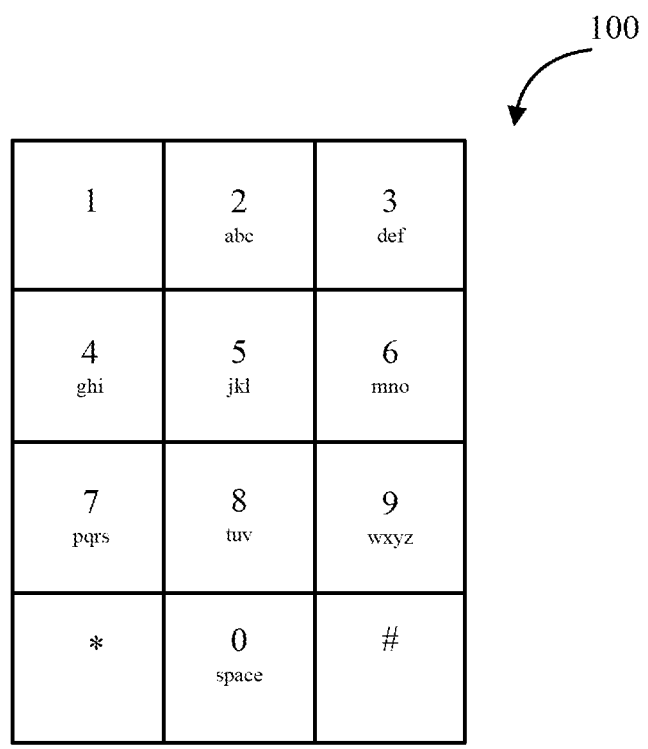
FIG. 1 depicts a standard phone keypad.

FIG. 1 depicts a standard phone keypad 100. On keypad 100, several of the numeric keys have associated therewith multiple letters of the alphabet. For example, the "2" key is associated with letters a, b, and c, while the "9" key is associated with letters w, x, y, and z. Users press the numeric keys to compose text messages.

There are several known techniques for composing text messages using the standard numeric phone keypad. In the multi-tap method, a user presses a key one or more times to choose the correct letter. For example, if a user wishes to type the letter b, the user would press the number 2 key twice. If a user wishes to type the letter y, the user would press the 9 key three times. A predictive text algorithm, such as the T9 algorithm, examines the first few keystrokes of input and presents the user with possible complete words to select from. In some instances, the presented word choices may be based on the user's previous selections.

In accordance with the exemplary aspects of the apparatus and methods described herein, the multi-tap, predictive text, and/or other text entry means may be applied in a touch-screen device. In the touch-screen device, selection may be made, for example, by selecting a key with a finger or other input device such as a stylus. The corners, edges, and center of the display screen are tracked and used to determine the location of the keys. The size of the key may depend on the proximity of the key to an edge or corner.

Various aspects of apparatuses and methods will now be presented. The apparatuses may include any device using a touch-screen. For example, the apparatuses may include a mobile telephone, personal digital assistant (PDA), laptop computer, calculator, and/or any other electronic device which uses a touch-screen. The apparatuses may form part of any wired or wireless communication system. By way of example, a wireless network may employ Code Division Multiple Access (CDMA) technology to implement CDMA 2000, Universal Terrestrial Radio Access (UTRA), Time Division Multiple Access (TDMA) to implement Global System for Mobile Communications (GSM), Orthogonal Frequency Division Multiple Access (OFDMA) to implement Evolved UTRA (E-UTRA), Ultra Mobile Broadband (UMB), IEEE 802.11 (Wi-Fi), IEEE 802.16 (WiMAX), IEEE 802.20, Flash-OFDM, or any other radio technology and/or communications protocol. Apparatuses forming part of a wired communication system may communicated user technology such as, for example, digital subscriber line (DSL), cable, fiber optics, twisted pair, Ethernet, and/or other wired communication methods.

An apparatus will be referred to herein as a "wireless device," but may also be referred to by those of skill in the art at as handset, subscriber unit, subscriber station, mobile station, mobile subscriber station, mobile unit, mobile radio, radio telephone, wireless modem, remote station, remote terminal, access terminal, user terminal, terminal, wireless communication device, user device, user equipment (UE), or some other terminology. The various concepts described throughout this disclosure are intended to apply to all suitable apparatuses regardless of their specific nomenclature.

Figure 2:
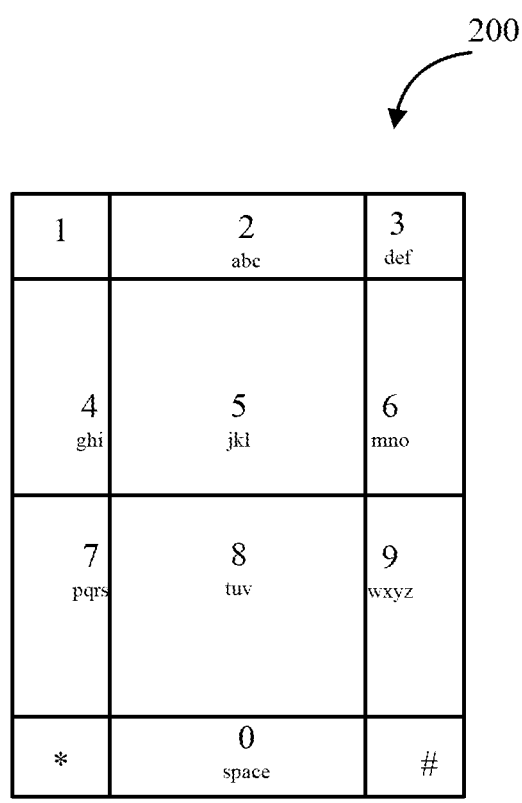
FIG. 2 depicts an exemplary touch-screen keypad.

FIG. 2 depicts an exemplary virtual keypad that may be displayed on a wireless device having a touch-screen. It is noted that this is merely one example of a virtual keypad layout. Other layouts wherein the size of the key depends on its location may also be used. As depicted in FIG. 2, the size of the keys generated depends on their location in reference to the edges or corners of the display. For example, the 1, 3, *, and # keys may be rendered smaller than other keys as their location in a corner can easily be ascertained by touch. Keys that are located on an edge of the device, but not at a corner, may be rendered slightly larger. For example, as depicted in FIG. 2, the 2, 4, 6, 7, 9, and 0 keys are rendered slightly larger. Those keys not located at edges or corners are most difficult to detect by touch. As such, these keys may be rendered larger than all other keys, as depicted by the 5 and 8 keys in FIG. 2. Keypad 200 may be rendered to overlay the text being typed. As such, the message being typed is still visible while typing. Alternatively, the keypad 200 may be placed behind the text being displayed as output.

Figure 3:
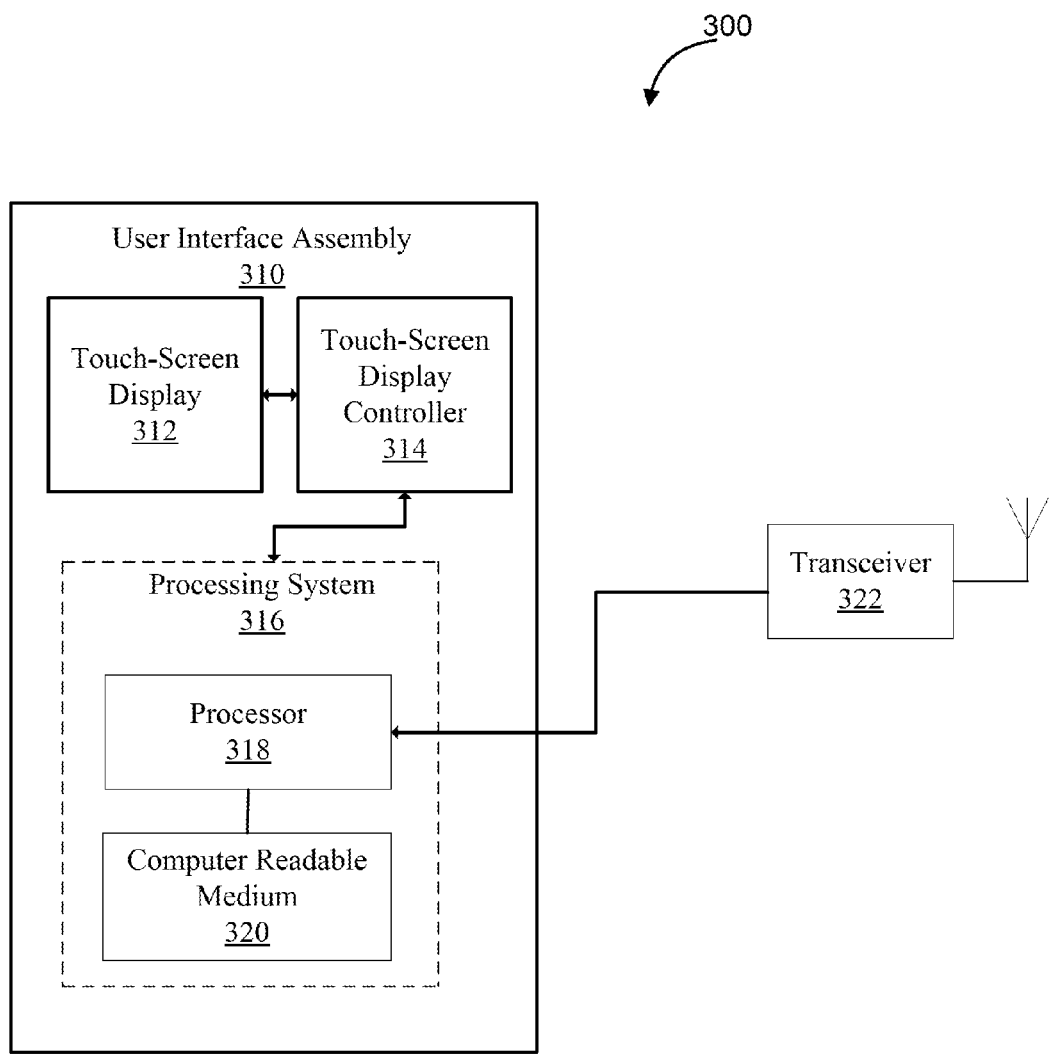
FIG. 3 is a conceptual diagram of a wireless device.

FIG. 3 is a conceptual block diagram illustrating an example of a hardware configuration for a wireless device 300. In this example, the wireless device 300 is shown with a user interface assembly 310 and a transceiver 322, although each wireless device 300 may include any number of transceivers. User interface assembly 310 may include a touch-screen display 312 serving as an input/output mechanism, a touch-screen controller 314 for controlling the operation of the touch-screen display 312, and a processing system 316. Processing system 316 may include one or more processors represented generally by processor 318 and a computer readable medium (e.g., memory) 320.

The processing system 316 may be implemented using software, hardware, or a combination of both. By way of example, the processor 318 may be implemented with one or more, or any combination of, microprocessors, digital signal processors (DSP), application specific integrated circuits (ASIC), microcontrollers, field programmable gate arrays (FPGA) or other programmable logic, state machines, discrete gates, transistor logic, discrete hardware components, or some other processing entity designed to perform the various functions presented throughout this disclosure. Those skilled in the art will recognize how best to implement the described functionality for the processing system 316 depending on the particular application and the overall design constraints imposed on the overall system.

Software shall be construed broadly to mean instructions, data, or any combination thereof, whether referred to as software, firmware, middleware, microcode, hardware description language, or otherwise. Computer readable medium may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The computer readable may be embodied in a computer product. The computer product may comprise packaging materials.

In the conceptual illustration presented in FIG. 3, the computer readable medium 320 is shown as part of the processing system 316 separate from the processor 318. However, as those skilled in the art will readily appreciate, the computer readable medium 320, or any portion thereof, may be external to the processing system 316. By way of example, the computer readable medium 318 may include a transmission line, a carrier wave modulated by data, and/or a computer product separate from the wireless device 300, all which may be accessed by the processor 318 through an interface (not shown). Alternatively, or in addition to, the computer readable medium 320, or any portion thereof, may be integrated into the processor 318, such as the case may be with cache and/or general register files.

Transceiver 322 may provide a transmitting and/or a receiving function. The transmitting function modulates a carrier with data for transmission over the wireless medium and the receiving function demodulates a carrier received over the wireless medium to recover data. Transceiver 322 may also provide various other functions, such as RF front-end processing, analog/digital conversion, timing and frequency estimation, channel estimation, modulation coding scheme (MCS), etc.

The processor 318 provides general processing functions, including the execution of software stored on the computer readable medium 320. The software includes instructions that when executed by the processor 318 cause the processing system 316 to perform the various functions presented throughout this disclosure.

The functions and methods described herein may be implemented by various modules in the wireless device. As used in this disclosure, the term "modules" is intended to refer to either hardware, firmware, a combination of hardware and software, software, or software in execution. By way of example, a module may be a process, an object, an executable, a thread of execution, a program, an application, a routine, a subroutine, a block of code or instructions, or any other software executed by the processor 318 or by another processing device. In this example, these modules may reside in the computer readable medium 320 which represents a single storage device, multiple storage devices, or other media. By way of example, a module may be loaded into RAM from a larger storage device prior to execution. During execution, the processor 318 may load the module, or any portion thereof into cache to increase access speed. One or more cache lines may then be loaded into a general register file for execution by the processor 318. When referring to the functionality of a module in software applications, it will be understood that such functionality may be implemented by the processor 318 when executing the module, or any portion thereof.

Figure 4:
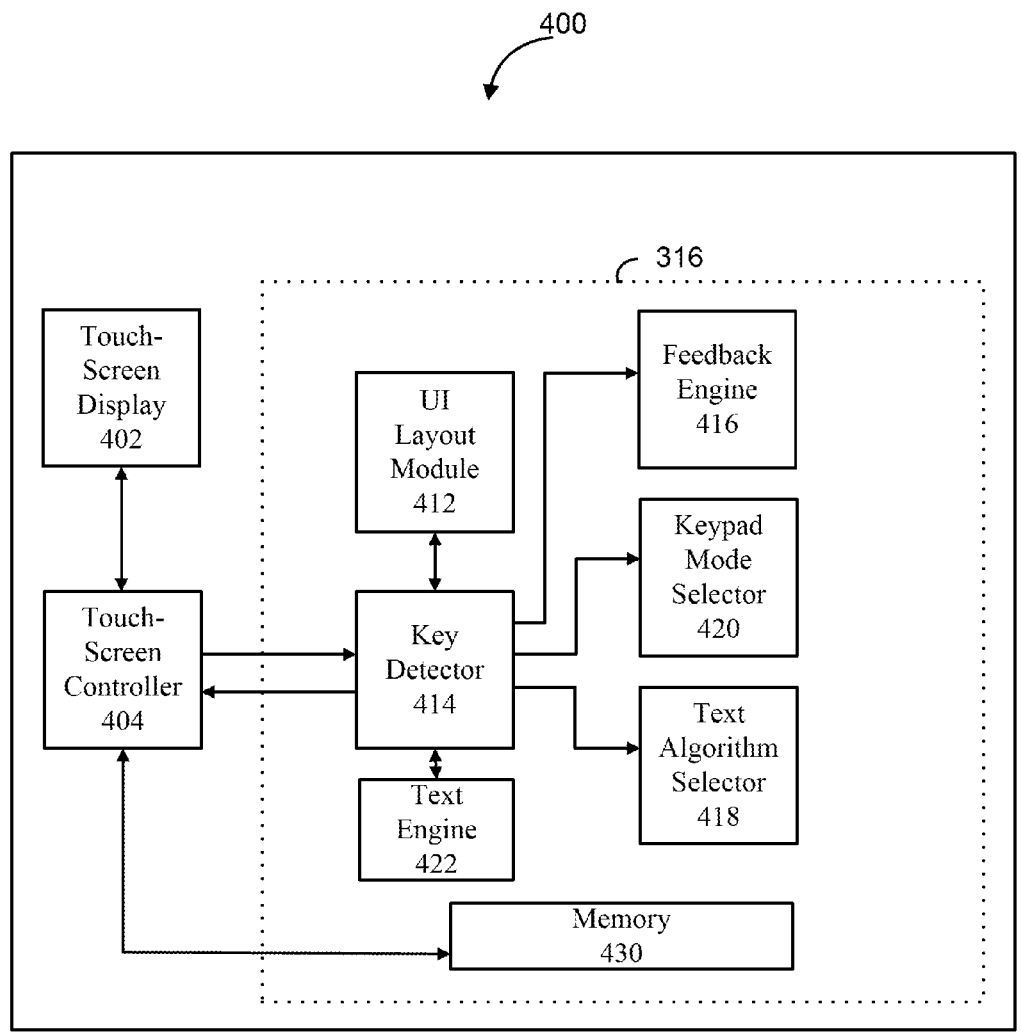
FIG. 4 is a conceptual diagram of a user-interface assembly.

Various modules to implement the functionality of a user interface assembly will now be presented with reference to FIG. 4. FIG. 4 is a conceptual diagram illustrating an example of a user interface assembly 400. User interface assembly 400 comprises a touch-screen display 402 which serves as both an input and output portal. To receive input, touch-screen display 402 may present a virtual keypad wherein multiple letters of the alphabet are associated with at least some of the numeric key. In some implementations, touch-screen display 402 may also present a full virtual QWERTY keyboard and/or other input mechanisms such as links or icons that can be selected by touch.

The operations of touch-screen display 402 may be controlled by a touch-screen controller 404. Touch-screen controller 404 may be configured to detect selections and to record the coordinates of each selection. Various techniques may be used to select keys from a keypad. For example, a selection may be registered when a user touches or "presses" a key. Selections may also be made by swiping a finger across the letters to be selected. Swiping and holding a particular key for a predetermined time period may also be used as an input mechanism.

Touch-screen controller 404 interfaces to a processing system 316 that comprises a plurality of modules. Processing system 316, as described above, may include one or more processors and a computer readable medium. The functions of the plurality of modules may be executed by the process and may reside in the computer readable medium. User interface (UI) layout module 412 may be configured to generate a virtual keypad and other text/graphics to be displayed by touch-screen display 402. According to some exemplary implementations, UI layout module 412 may be configured to generate a keypad layout such as depicted in FIG. 2, wherein the size of the virtual keys depends on the location of the key with respect to the edges and corners of the display area.

UI layout module 412 may be configured to determine the size of the display 402 and render a keypad layout such that the two keys that are not located at an edge or corner of the display are placed in the center of the display and are larger than the remaining keys. For example, the 5 key may be located such that its bottom edge is aligned with the vertical center of the display while the 8 key may be rendered such that its top edge is aligned with the vertical center of the display area. As the center of a handheld device can be estimated easily by touch, a user may be able to locate even those keys not tied to an edge or corner without looking at the keypad.

As the corners of a display area are easier to detect by touch, UI layout module 412 may render those numbers smaller than all others. Those keys on an edge, but not at a corner, may be rendered larger than those keys at a corner but smaller than those keys in the center. UI layout module 412 may also be configured to maintain a coordinate map which maps the coordinates of each key.

Key detector 414 may be configured to receive coordinates of a keypad input selection and to determine the key selected. Key detector 414 may refer to the mapping maintained by UI layout module 412 to determine the selected key. According to some aspect, an alert may be generated when a selection is made to alert the user that the input has been received. As such, key detector 414 may interface with feedback engine 416, which generates such alerts. Alerts may be, for example, an audible alert, a vibration, a visual alert such as a blinking key, and/or any other type of alert.

A text algorithm selector 418 may be configured to set the texting algorithm, for example, to a multi-tap, predictive (e.g., T9), and/or other texting algorithm. The settings may be pre-configured or may be user configurable. Keypad mode selector 420 may be configured to set the input selection mode. For example, input selections may be made by pressing/tapping a key, swiping across keys, swiping and holding at a particular key for a predetermined time period, and/or other selection means.

Key detector 414 may be further configured to report the texting algorithm to text engine 422, along with the determined key selection(s). Text engine 422 uses this information to determine the characters and/or words to be displayed. The results may be forwarded back to key detector 414 to be sent as output to the touch-screen display. Memory 430 may be provided for storing data used by the remaining elements of mobile device 400.

Figure 5:
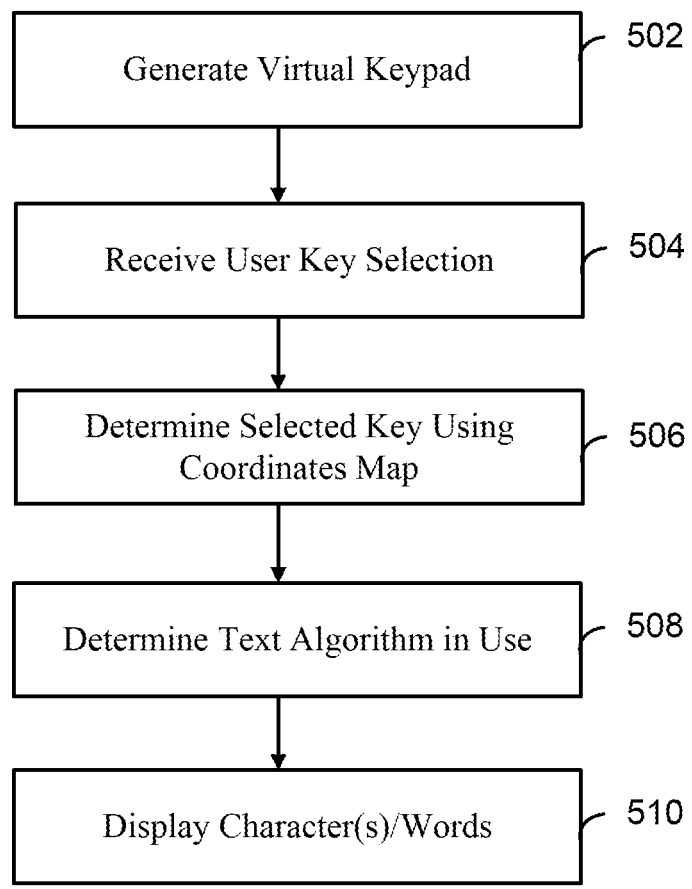
FIG. 5 is a flowchart depicting a method for entering text, in accordance with the various disclosed techniques.

FIG. 5 is a high-level flowchart depicting an exemplary method of entering data, in accordance with the techniques disclosed herein. As depicted at 502, a virtual keypad may be generated having keys sized based on their location. That is, each key or a group of keys may be sized according to whether it is located near an edge of a touch-screen display, in a corner, or in the center of the display and having no contact with a corner or edge.

As depicted at 504, a user selection of a key may be received. As described herein, various techniques for recording a user selection may be used. For example, a user selection may be indicated by pressing/tapping a key, swiping across keys, or swiping and holding at a particular key for a predetermined time period. The selected key may have associated therewith coordinates which may be used to determine the value of the selected key. Thus, as depicted at 506, a value of the key may be determined by consulting a key coordinate mapping table.

As depicted at 508, the text algorithm in use may be determined. The characters to be output may depend on the text algorithm in use. For example, selection of a particular key one or more times when a multi-tap algorithm is in use may cause a single character to be output. If a predictive text algorithm is used, selecting a particular key may cause one or more probable words to be displayed. The user can then select the desired word. Thus, as depicted at 510, one or more characters/words may be displayed based on the value of the selected key and the text algorithm in use.

Figure 6:
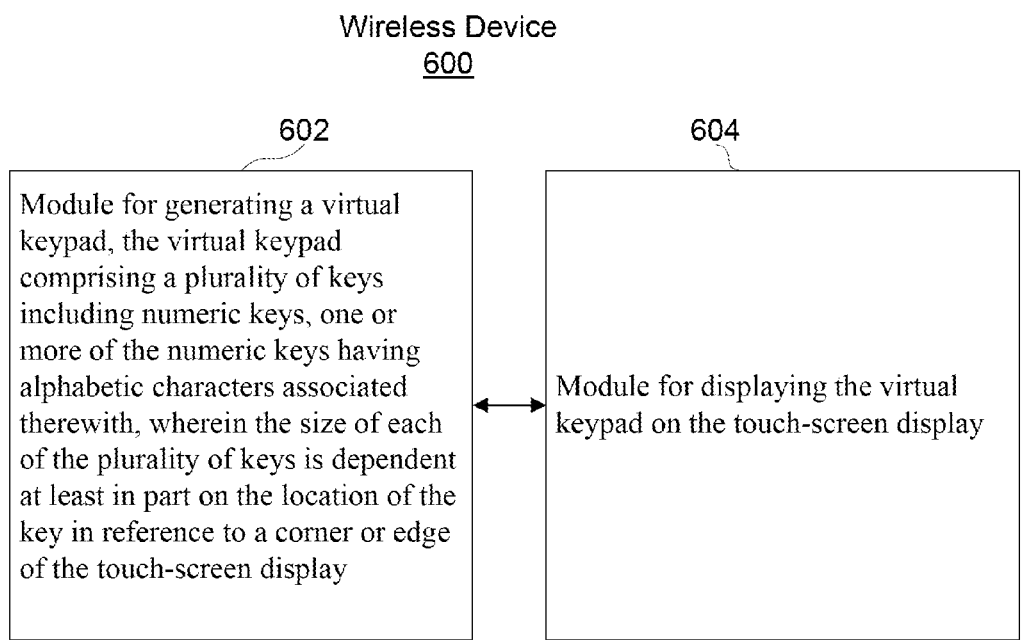
FIG. 6 is a conceptual block diagram illustrating an example of the functionality of a wireless device.

FIG. 6 is a block diagram illustrating an example of the functionality of a wireless device 600. In this example, the wireless device 600 includes a module 602 for generating a virtual keypad, the virtual keypad comprising a plurality of keys including numeric keys, one or more of the numeric keys having alphabetic characters associated therewith, wherein the size of each of the plurality of keys is dependent at least in part on the location of the key in reference to a corner or edge of a touch-screen display, and a module 604 for displaying the virtual keypad on the touch-screen display.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method for entering data, comprising:
   generating a virtual keypad, the virtual keypad comprising a plurality of keys including numeric keys, one or more of the numeric keys having alphabetic characters associated therewith, wherein the size of each of the plurality of keys is dependent at least in part on the location of the key in reference to a corner or edge of a touch-screen display;
   arranging the plurality of keys in rows and columns wherein a subset of the plurality of keys are located along an edge of the touch screen display and at least one of the plurality of keys is not located along an edge of the touch-screen display and each of the remainder of the plurality of keys are located along an edge of the touch-screen display, wherein the at least one of the plurality of keys not located along an edge of the touch-screen display is larger than the remainder of the plurality of keys;
   displaying the virtual keypad on the touch-screen display; and
   wherein one or more of the plurality of keys having contact with an edge of the touch-screen display but not located in a corner of the touch-screen display are larger than one or more of the plurality of keys located in a corner of the touch-screen display and smaller than the at least one of the plurality of keys not located along an edge of the touch-screen display.

2. The method of claim 1, further comprising:
   receiving a user selection of one or more of the plurality of keys;
   determining a text algorithm that has been selected for data entry; and
   outputting one or more characters or words based on the user selection and the text algorithm.

3. The method of claim 2, wherein the text algorithm is one of a multi-tap text entry algorithm and a predictive text entry algorithm.

4. The method of claim 1, wherein the plurality of keys are ordered in a manner of a standard telephone keypad.

5. A computer program product, comprising:
   a non-transitory computer-readable medium comprising:
   code for causing a computer to generate a virtual keypad, the virtual keypad comprising a plurality of keys including numeric keys, one or more of the numeric keys having alphabetic characters associated therewith, wherein the size of each key is dependent at least in part on the location of the key in reference to a corner or edge of a touch-screen display, the virtual keypad to be displayed on the touch-screen display; wherein the code for causing the computer to generate a virtual keypad further comprises code for causing the computer to arrange the plurality of keys in rows and columns wherein a subset of the plurality of keys are located along an edge of the touch screen display and at least one of the plurality of keys is not located along an edge of the touch-screen display and each of the remainder of the plurality of keys are located along an edge of the touch-screen display, wherein the at least one of the plurality of keys not located along an edge of the touch-screen display is larger than the remainder of the plurality of keys; and
   wherein one or more of the plurality of keys having contact with an edge of the touch-screen display but not located in a corner of the touch-screen display are larger than one or more of the plurality of keys located in a corner and smaller that the at least one of the plurality of keys not located along an edge of the touch-screen display.

6. The computer program product of claim 5, wherein the non-transitory computer-readable medium further comprises:
   code for causing the computer to receive a user selection of one or more of the plurality of keys;
   code for causing the computer to determine a text algorithm that has been selected for data entry;
   code for causing the computer to output one or more characters or words to the touch-screen display based on the user selection and the text algorithm.

7. The computer program product of claim 6, wherein the text algorithm is one of a multi-tap text entry algorithm or a predictive text entry algorithm.

8. The computer program product of claim 5, wherein the plurality of keys are ordered in a manner of a standard telephone keypad.

9. An apparatus, comprising:
   means for generating a virtual keypad,
   the virtual keypad comprising a plurality of keys including numeric keys, one or more of the numeric keys having alphabetic characters associated therewith, wherein the size of each key is dependent at least in part on the location of the key in reference to a corner or edge of a touch-screen display; and
   means for displaying the virtual keypad on the touch-screen display; wherein the means for generating a virtual keypad further comprises means for arranging the plurality of keys in rows and columns wherein a subset of the plurality of keys are located along an edge of the touch screen display and at least one of the plurality of keys is not located along an edge of the touch-screen display and each of the remainder of the plurality of keys are located along an edge of the touch-screen display, wherein the at least one of the plurality of keys not located along an edge of the touch-screen display is larger than display the remainder of the plurality of keys; and
   wherein one or more of the plurality of keys having contact with an edge of the touch-screen display but not located in a corner of the touch-screen display are larger than one or more of the plurality of keys located in a corner and smaller that the at least one of the plurality of keys not located along an edge of the touch-screen display.

10. The apparatus claim 9, further comprising:
    means for receiving a user selection of one or more of the plurality of keys;

means for determining a text algorithm that has been selected for data entry; and means for outputting one or more characters or words based on the user selection and the text algorithm.

11. The apparatus of claim 10, wherein the text algorithm is one of a multi-tap text entry algorithm or a predictive text entry algorithm.

12. The apparatus of claim 9, wherein the plurality of keys are ordered in a manner of a standard telephone keypad.

13. An apparatus for wireless communications, comprising: a touch-screen display; and a user interface module for generating a virtual keypad, the virtual keypad comprising a plurality of keys including numeric keys, one or more of the numeric keys having alphabetic characters associated therewith, wherein the size of each of the plurality of keys is dependent at least in part on the location of the key in reference to a corner or edge of the touch-screen display;

wherein the user interface module is further configured to arrange the plurality of keys in rows and columns wherein a subset of the plurality of keys are located along an edge of the touch screen display and at least one of the plurality of keys is not located along an edge of the touch-screen display and each of the remainder of the plurality of keys are located along an edge of the touch-screen display, wherein the at least one of the plurality of keys not located along an edge of the touch-screen display is larger than the remainder of the plurality of keys; and wherein at least one of the plurality of keys having contact with an edge of the touch-screen display but not located in a corner of the touch-screen display are larger than at least one of the plurality keys located in a corner of the touch-screen display and smaller than the at least one of the plurality of keys not located along an edge touch-screen display.

14. The apparatus of claim 13, wherein the touch-screen display is further configured to receive a user selection of one or more of the plurality of keys, the apparatus further comprising:

a text algorithm selector for determining a pre-selected text input algorithm; and a text engine for determining one or more characters or words based on the user selection and the pre-selected text input algorithm, wherein the one or more characters or words are output via the touch-screen display.

15. The apparatus of claim 14, wherein the text input mode is one of a multi-tap text entry mode and a predictive text entry mode.

16. The apparatus of claim 13, wherein the keys are ordered in a manner of a standard telephone keypad.

* * * * *